(12) United States Patent
Schilling et al.

(10) Patent No.: US 7,187,706 B2
(45) Date of Patent: Mar. 6, 2007

(54) HANDOFF AND SOURCE CONGESTION AVOIDANCE SPREAD-SPECTRUM SYSTEM AND METHOD

(75) Inventors: Donald L. Schilling, Palm Beach Gardens, FL (US); Joseph Garodnick, Centerville, MA (US)

(73) Assignee: Linex Technologies, Inc., West Long Branch, NJ (US)

(*) Notice: Subject to any disclaimer, the term of this patent is extended or adjusted under 35 U.S.C. 154(b) by 721 days.

(21) Appl. No.: 09/968,832

(22) Filed: Oct. 2, 2001

(65) Prior Publication Data
US 2002/0094013 A1 Jul. 18, 2002

Related U.S. Application Data

(63) Continuation of application No. 09/758,981, filed on Jan. 12, 2001.

(51) Int. Cl.
*H04B 1/69* (2006.01)
*H04Q 7/00* (2006.01)
*H04Q 7/20* (2006.01)

(52) U.S. Cl. ............... 375/141; 370/332; 455/437; 455/439

(58) Field of Classification Search ............ 375/130, 375/140, 141, 143; 370/331, 332, 335, 280, 370/310.2; 455/436, 437, 438, 439, 442
See application file for complete search history.

(56) References Cited

U.S. PATENT DOCUMENTS 5,195,091 A * 3/1993 Farwell et al. ............... 370/336
5,305,308 A * 4/1994 English et al. ............... 370/335
5,818,820 A * 10/1998 Anderson et al. ............ 370/280

(Continued)

OTHER PUBLICATIONS

3G TS 25.3331 (Oct. 1999) 3$^{rd}$ Generation Partnership Project (3GPP); Technical Specification Group (TSG) RAN; RRC Protocol Specification.

(Continued)

*Primary Examiner*—Don N. Vo
(74) *Attorney, Agent, or Firm*—David Newman (57) ABSTRACT

A spread-spectrum, code-division-multiple-access (CDMA), system with a remote station (RS) communicating with a first base station (BS). The remote station receives the first BS-packet signal, and transmits a first RS-packet signal to the first base station. The first RS-packet signal is spread by a first RS-chip-sequence signal at a second frequency. The first base station receives the first RS-packet signal. The first base station stores and forwards the despread first RS-packet signal to a central office (CO). The remote station monitors control and packet transmission channels of other base stations in geographic proximity to the remote station. Each of the base stations transmit BS-packet signals. The remote station determines, based on signal metrics and available capacity, when to change from the first base station to the second base station. The second base station stores and then forwards the despread second RS-packet signal to the central office. The despread second RS-packet signal includes a source address from the second base station and the source address from the remote station. For return communications from the central office, the central office reads the source address from the second base station, and routes return packet signals, denoted herein as CO-packet through the second base station to the remote station.

25 Claims, 3 Drawing Sheets

U.S. PATENT DOCUMENTS

| | | | | |
|---|---|---|---|---|
| 5,859,879 A | * | 1/1999 | Bolgiano et al. | 370/330 |
| 5,864,578 A | * | 1/1999 | Yuen | 375/143 |
| 5,898,682 A | * | 4/1999 | Kanai | 370/331 |
| 5,917,811 A | * | 6/1999 | Weaver et al. | 370/332 |
| 5,940,430 A | * | 8/1999 | Love et al. | 375/130 |
| 5,940,761 A | * | 8/1999 | Tiedemann et al. | 455/437 |
| 6,314,126 B1 | * | 11/2001 | Schilling et al. | 375/130 |
| 6,608,823 B1 | * | 8/2003 | Kito | 370/331 |
| 2002/0077104 A1 | * | 6/2002 | Chen et al. | 455/436 |
| 2002/0196840 A1 | * | 12/2002 | Anderson et al. | 375/130 |
| 2003/0206530 A1 | * | 11/2003 | Lindsey et al. | 370/277 |
| 2005/0059401 A1 | * | 3/2005 | Chen et al. | 455/437 |
| 2005/0122917 A1 | * | 6/2005 | Tiedemann | 370/300 |

OTHER PUBLICATIONS

3G TS 25.304 V.3.0.0 (Oct. 1999) 3$^{rd}$ Generation Partnership Project; Technical Specification Group Radio Access Network; UE Procedures in idle Mode and Procedures for Cell Reselection in Connected Mode (3G TS 25.304 version 3.0.0).

3G TS 25.304 V.5.0.0 (Mar. 1999) 3$^{rd}$ Generation Partnership Project; Technical Specification Group Radio Access Network; UE Procedures in idle Mode and Procedures for Cell Reselection in Connected Mode (3G TS 25.304 version 5.0.0).

A Reliable, Efficient Topology Broadcast Protocol for Dynamic Networks, Bhargay Bellur and Richard G. Ogier, IEEE Infocom, Mar. 21-25, 1999.

Leonard Kleinrock, Static Flow Control in Store-and-Forward Computer Networks, IEEE Trans. On Computers, vol. COM-28, No. 2, Feb. 1980. \.

Robust Adaptive Network Protocols for Restrictive Environments, SRI International, ITAD-1648-FR-99-054, SRI Project Number 1648, for U.S. Arym Communications-Electronics Command, Fort Monmouth, NJ.

* cited by examiner

HANDOFF AND SOURCE CONGESTION AVOIDANCE SPREAD-SPECTRUM SYSTEM AND METHOD

RELATED PATENTS

This patent stems from a continuation application of U.S. patent application Ser. No. 09/758,981, and filing date of Jan. 12, 2001, entitled SPREAD-SPECTRUM HANDOFF AND SOURCE CONGESTION AVOIDANCE SYSTEM AND METHOD by inventors, DONALD L. SCHILLING and JOSEPH GARODNICK. The benefit of the earlier filing date of the parent patent application is claimed for common subject matter pursuant to 35 U.S.C. § 120.

BACKGROUND OF THE INVENTION

This invention relates to packetized, code-division-multiple-access communications, and more particularly to handoff of a remote station, between base stations.

DESCRIPTION OF THE RELEVANT ART

In a wireless, direct-sequence, spread-spectrum, packetized, code-division-multiple-access (CDMA) communications system, a remote station (RS) transmits to a base station (BS), and a base station transmits to a remote station. The selection of base station may he determined from the power level received at the base station from the remote station, and/or from the power level received at the remote station from the base station. During communications between the remote station and the base station, if either the power level received at the remote station, or the power level received at the base station, is too small, then unacceptable communications results, and a change of base station is required or the communications channel is "dropped". The change of base station is referred in the art as a handover or handoff.

In the prior art, a base station may initiate a handoff, or the remote station may initiate a handoff. The handoff may be a hard handoff, when communications with the remote station is stopped for a short period of time, until handoff to a new base station is complete. The hard handoff may result in loss of data. To avoid the loss of data, the data that might be lost can be stored, and when the handoff is complete, the stored data can be transmitted at an increased data rate and an increased power level. This sometimes is referred to as store and forward. Ths store and forward of data during the hard handoff can prevent the loss of data.

For a soft handoff, the remote station, at the same time, receives data from, and transmits data to, the old base station and the new base station. The simultaneous transmission results in an increase in received signal power, by as much as 3 dB, since two base stations are transmitting to the remote station.

For the hard handoff and the soft handoff, initially the remote station and/or base station determine that a handoff is required, and then as to which of several base stations the remote station finally will communicate. For the handoff, an initial remote station transmitter power is determined, then the necessary overhead operations take place to effect the handoff. During this process, the hard handoff results in data loss, which is unacceptable for data communications, and the soft handoff results in a decrease in capacity, since two base stations are simultaneously transmitting and/or receiving the same data. In addition, the handoff procedures currently in use were for circuit-switched systems.

SUMMARY OF THE INVENTION

A general object of the invention is a handoff, for a direct-sequence, spread-spectrum, CDMA packet-switched system, between base stations, without loss of capacity or loss of data.

Another object of the invention is to provide continuous operation of a remote station between base stations, without the large overhead operation currently required of a handoff.

According to the present invention, as embodied and broadly described herein, an improvement for a method and system is provided to a spread-spectrum, code-division-multiple-access (CDMA), system. Assume that a remote station (RS) is communicating with a first base station (BS) within a spread-spectrum, CDMA network. The spread-spectrum, CDMA network may be a star network with the same overhead information which is typically used in current cellular systems, or a distributed network. The first base station transmits, using radio waves, a first BS-packet signal to the remote station. The first BS-packet signal is spread by a first BS-chip-sequence signal at a first frequency $f_1$.

The remote station receives the first BS-packet signal. A replica of the first BS-chip-sequence signal, or equivalently a matched filter matched to the first BS-chip-sequence signal, is used by the remote station for despreading first BS-packet signals arriving from the first base station. Each BS-packet signal, or certain BS-packet signals, contain capacity availability data, and which BS-chip-sequence signals are available, for the respective base station.

The remote station transmits, using radio waves, a first RS-packet signal to the first base station. The first RS-packet signal is spread by a first RS-chip-sequence signal at a second frequency $f_2$. A replica of the first RS-chip-sequence signal, or equivalently a chip-sequence generator matched to the first RS-chip-sequence signal, is used by the remote station for spreading the first RS-packet signal. The first RS-packet signal includes a source address from the remote station.

The first base station receives the first RS-packet signal at the second frequency $f_2$. The first base station normally would despread the first RS-packet signal, and then send the despread first RS-packet signal to a central office. The despread first RS-packet signal includes a source address from the remote station, and the source address from the first base station.

While the remote station communicates with the first base station, the remote station also monitors spread-spectrum signals from other base stations, which are in geographic proximity to the remote station. The remote station may continuously monitor, periodically monitor, or monitor when the received power level at the remote station falls below a threshold or when the capacity availability in the first base station falls below a given threshold. The remote station may monitor the control and packet transmission channels, or other channels, of the other base stations. The control and packet transmission channels refer to channels that are continuously operating, or nearly continuously operating, from the other base stations.

Each of the base stations transmits, using radio waves, a BS-packet signal spread by a second BS-chip-sequence signal at the first frequency $f_1$. The remote station monitors a signal metric of the control and packet transmission channels from the first base station, and monitors the same signal metric of the control and packet transmission channels from the other base stations. The remote station determines when the signal metric of the first BS-packet signal falls below a threshold, and that the signal metric of a BS-packet signal from one base station, or several BS-packet signals from several base stations, is above the threshold. The remote station also determines available capacity of the one or more base stations. Upon determining the foregoing threshold crossings, and capacity levels, the remote station determines to handoff to a second base station. The second base station is defined herein to be the particular base station, out of the one or more base stations monitored by the remote station, to which the remote station decides to handoff. The second base station, as set by engineering design criteria, has sufficiently high signal level and sufficient capacity, for communicating with the remote station. Upon meeting these criteria, the remote station changes communications from the first base station to the second base station.

A packet switched system makes use of the fact that a packet contains a finite number of bits and that the remote station transmits nothing between packets. Even in voice communications, the dead time, i.e., the time between spoken words, including pauses, is about sixty percent. When a remote station transmits a packet there is a dead time, the time between the remote station transmission of the next packet. This dead time is unknown a priori at the base station and often unknown by the remote station.

Thus, after transmission of a packet i, the base station will use the chip-sequence signal and the available capacity in the base station, given to a first remote station, for the next remote station requiring its use. Such operation is required to ensure, maximum throughput through the system. Thus, the original remote station desiring to send packet i+1, may find that the base station has no capacity available. This metric, denoted herein a BS metric, is a second reason (the first being low power) for the remote station to handover to a second base station.

In response to determining to change communications between base stations, the remote station transmits, using radio waves, a second RS-packet signal, which is called the second RS-packet signal, to the second base station, using a newly selected spreading RS-chip-sequence signal. The newly selected spreading RS-chip-sequence signal, defined herein as the second RS-chip-sequence signal, is provided by the second base station. The term second RS-packet signal, as used herein, refers to the initial RS-packet signal transmitted from the remote station to the second base station, during handoff, using the second RS-chip-sequence signal. Accordingly, the second base station despreads the second RS-packet signal using the appropriate RS-chip-sequence signal or matched filter technology.

After the second base station receives and despreads the second RS-packet signal at the second frequency, the second base station sends the despread second RS-packet signal to the central office (CO). The despread second RS-packet signal includes a source address from the second base station and the source address from the remote station.

For return communications from the central office to the remote station, the central office reads the source addresses from the remote station and the forwarding base station. For this example, the central office reads the source address from the second base station. From the source addresses, the central office knows to route return packet signals, denoted herein as the CO-packet signal, through the second base station to the remote station.

The central office sends to the spread-spectrum, CDMA network, a CO-packet signal, which includes destination addresses for the second base station and the remote station. The second base station receives the CO-packet signal. The second base station transmits, using radio waves, the CO-packet signal, at the first frequency, as a third BS-packet signal spread by the second BS-chip-sequence signal. The term third BS-packet signal, as used herein, refers to the BS-packet signal transmitted from the second base station, containing the information from the CO-packet signal. The remote station receives and despread the third BS-packet signal, i.e., the CO-packet signal.

This invention has the central office route the CO-packet signal to the second base station, since the second base station is the base station to which the remote station last transmitted, as determined from the second base station source address and the remote station source address in the second packet signal previously received at the central office.

The present invention refers to a first frequency $f_1$ and a second frequency $f_2$, which, for frequency division duplex (FDD), would be different frequencies, preferably outside the correlation bandwidth of each other. The present invention also may be used with time division duplex (TDD), with the first frequency $f_1$ the same as the second frequency $f_2$. Both FDD technology and TDD technology are well know in the art.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like reference numerals indicate like elements throughout the several views.

The instant invention disclosed herein provides a novel improvement and method to a direct-sequence, spread-spectrum, packetized, code-division-multiple-access (CDMA) system, and more particularly to a cellular structure or environment with each cell containing a base station communicating with a plurality of remote stations, using spreadi spectrum modulation. The present invention is for packet data, with data being sent between a remote station and a base station as packet signals. A remote station might be a hand-held unit or telephone, a connection to a computer or other modem, or other device which may be stationery or in motion.

The base station is assumed to transmit to the plurality of remote stations at a first frequency $f_1$, also known as a carrier frequency of the base station transmitter. The plurality of remote stations is assumed to transmit to the base station at a second frequency $f_2$, also know as the carrier frequency of the remote station transmitters. For frequency division duplex operation, the second frequency $f_2$ is different the first frequency $f_1$, and typically outside the correlation bandwidth of the first frequency $f_1$. For time division duplex (TDD) operation, the second frequency $f_2$ is the same as the first frequency $f_1$. The present invention works with either a FDD CDMA system or a TDD CDMA system.

A particular channel from the base station to a remote station is defined or determined by a particular chip-sequence signal, as is well known in the art for direct-sequence (DS) code-division-multiple access (CDMA) systems. A particular channel from a particular remote station to the base station is defined or determined by a particular chip-sequence signal, as is well known in CDMA systems.

CDMA Network Architecture

The improvement to a method and system of the instant invention provides handoff for a spread-spectrum CDMA network. The spread-spectrum, CDMA network may be a star network or a distributed network.

Figure 1:
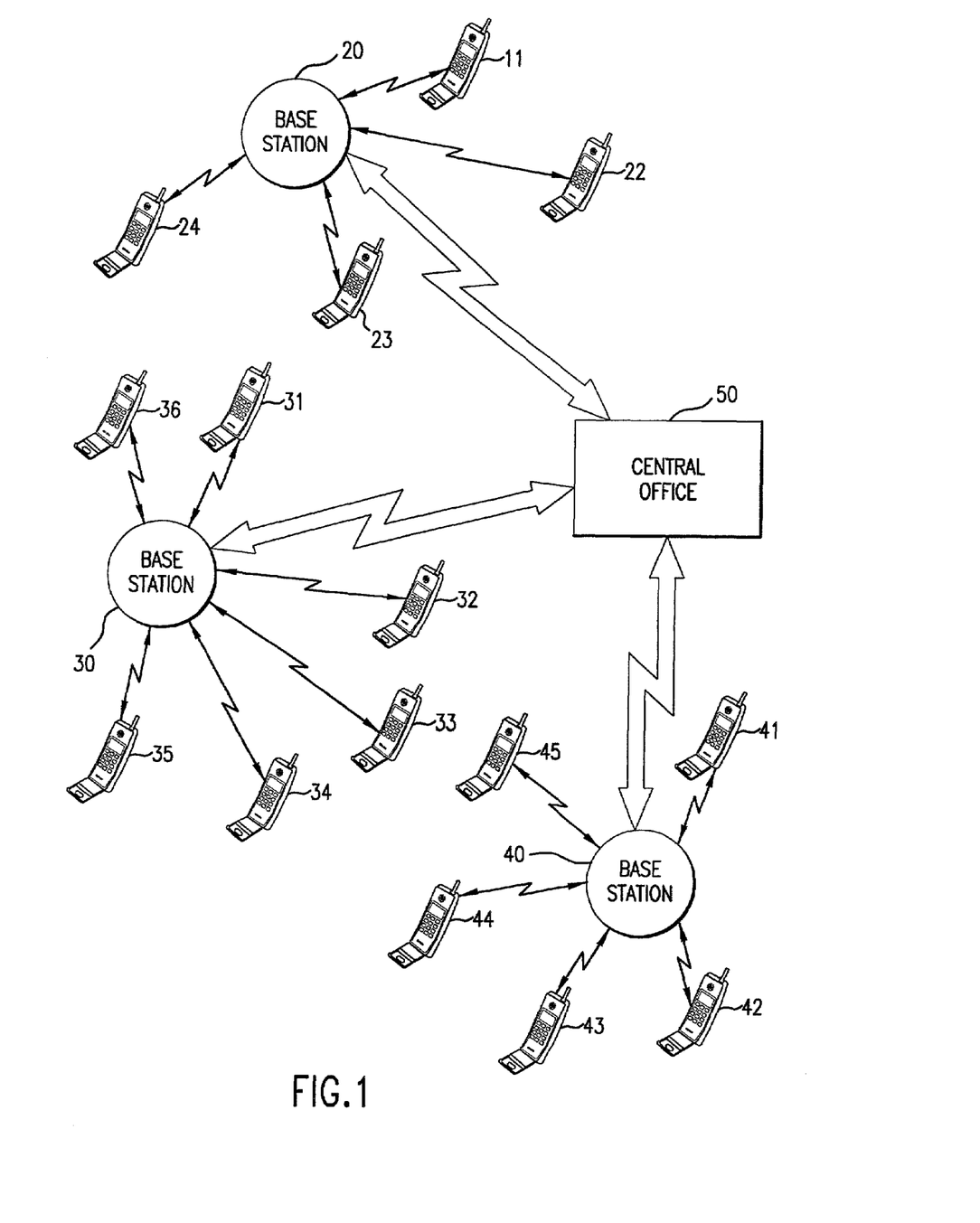
FIG. 1 is a block diagram of a current cellular spread-spectrum system, showing all base stations communicating with a central office.

As illustratively shown in FIG. 1, a star network, as presently is used for cellular networks, is used to communicate data between a central office 50 and a plurality of remote stations (RS). A plurality of base stations 20, 30, 40, communicate directly with the central office 50. A first base station 20 communicates data between a first plurality of remote stations 11, 22, 23, 24. A second base station 30 communicates data between a second plurality of remote stations 31, 32, 33, 34, 35, 36. A third base station 40 communicates data between a third plurality of remote stations 41, 42, 43, 44, 45.

Figure 2:
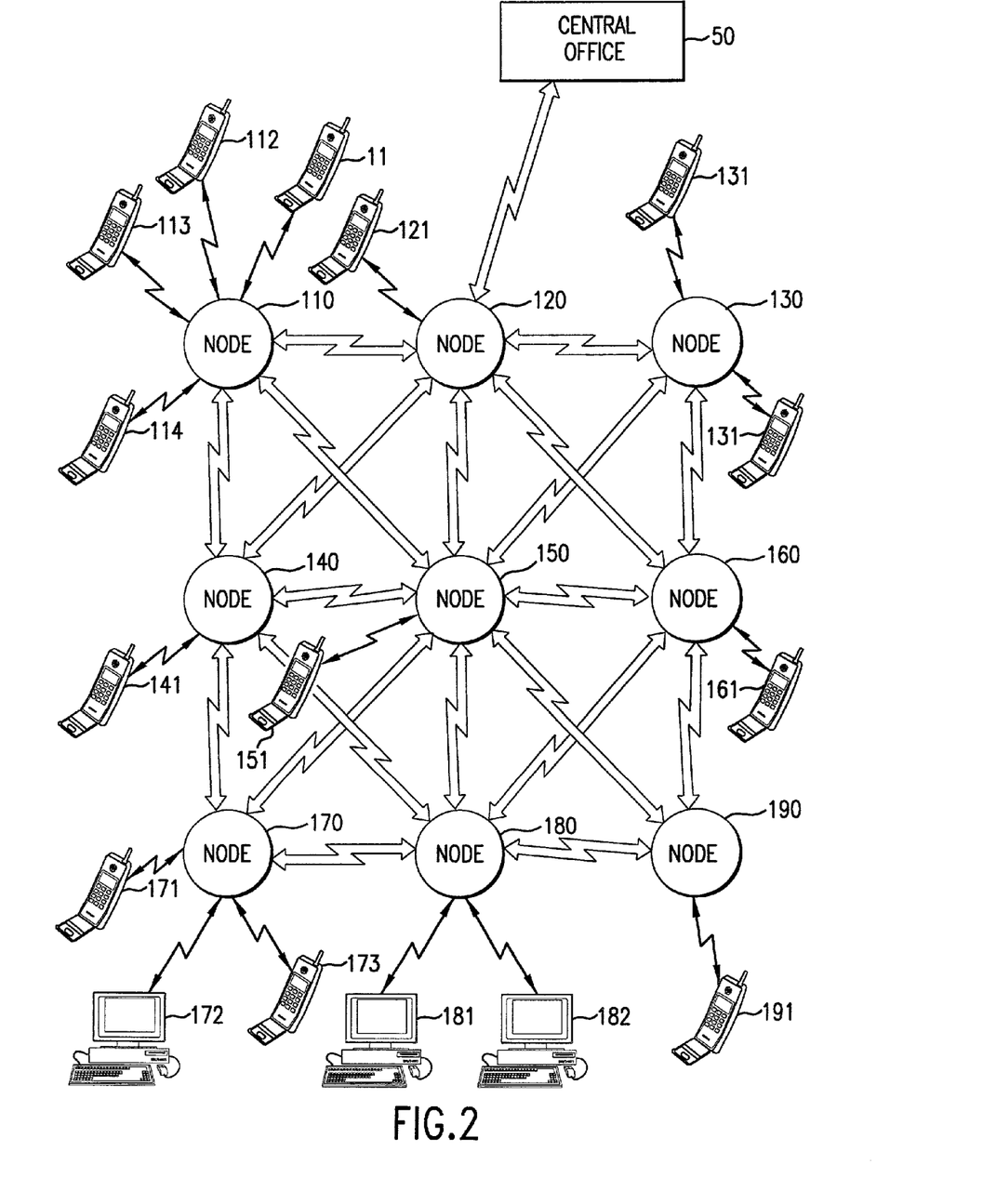
FIG. 2 is a block diagram of a distributed network, spread-spectrum system.

The distributed network, as illustrated in FIG. 2, provides an alternative architecture, for routing packet signals between a central office, through a plurality of nodes, to a remote station. Each of the nodes in a distributed system includes a base station, plus additional system components for the distributed system. A representative distributive is incorporated herein by reference, and is disclosed in U.S. patent application Ser. No. 09/729,911, with filing date of Dec. 6, 2000, entitled, DISTRIBUTED NETWORK, SPREAD-SPECTRUM SYSTEM, by inventors Donald L. Schilling and Joseph Gardnick, now U.S. Pat. No. 6,493,377, with issue date Dec. 10, 2002.

As illustratively shown in FIG. 2, a distributed network, direct-sequence, spread-spectrum, packetized, code-division-multiple-access (CDMA) system, by way of example, comprises a plurality of remote stations and a plurality of nodes 110, 120, 130, 140, 150, 160, 170 180, 190. The plurality of nodes 110, 120, 130, 140, 150, 160, 170 180, 190 forms the distributed network. The distributed network plus the plurality of remote stations form the distributed system. The plurality of nodes 110, 120, 130, 140, 150, 160, 170 180, 190 of FIG. 2, depicts, as an illustration, a first node 110, a second node, 120, a third node 130, a fourth node 140, a fifth node 150, a sixth node 160, a seventh node 170, an eighth node 180 and a ninth node 190.

In the plurality of nodes 110, 120, 130, 140, 150, 160, 170 180, 190, one node, which happens to be labeled the second node 120, is a hub node, which communicates to a central telephone office 50. In an alternative embodiment, a set of the plurality of nodes (hubs) communicates to the central office 50. The set of the plurality of nodes (hubs), may include the entire plurality of nodes.

The plurality of nodes 110, 120, 130, 140, 150, 160, 170 180, 190 covers a geographic area. Each node in the plurality of nodes 110, 120, 130, 140, 150, 160, 170 180, 190 forms a micro-cell. A micro-cell typically has a radius much less than one mile.

In the plurality of nodes 110, 120, 130, 140, 150, 160, 170 180, 190, the first node 110 communicates with the second node 120, the fourth node 140 and the fifth node 150. The second node 120 communicates with the first node 110, the third node 130, the fourth node 140, the fifth node 150 and the sixth node 160. The third node communicates with the second node 120, the fifth node 150 and the sixth node 160. The fourth node communicates with the first node 110, the second node 120, the fifth node 150, the seventh node 170 and the eighth node 180. The fifth node communicates with the first node 110, the second node 120, the third node 130, the fourth node 140, the sixth node 160, the seventh node 170, the eighth node 180 and the ninth node 190. The sixth node 160 communicates with the second node 120, the third node 130, the fifth node 150, the eighth node 180 and the ninth node 190. The seventh node 170 communicates with the fourth node 140, the fifth node 150 and the eighth node 180. The eighth node 180 communicates with the fourth node 140, the fifth node 150, the sixth node 160, the seventh node 170 and the ninth node 190. The ninth node communicates with the fifth node 150, the sixth node 160 and the eighth node 180.

FIG. 2 shows the first node 110 communicating with a first plurality of remote stations 11, 112, 113, 114. The second node 120 communicates with a second plurality of remote stations, with FIG. 2 showing a first remote station 121 of the second plurality of remote stations. The third node 130 communicates with a third plurality of remote stations 131, 132 and the fourth node 140, the fifth node 150 and the sixth node 160 communicate with a fourth plurality of remote stations, a fifth plurality of remote stations, and a sixth plurality of remote stations, respectively. FIG. 2 shows the fourth node 140 communicating with a first remote station 141 of the fourth plurality of remote stations, the fifth node 150 communicating with a first remote station 151 of the fifth plurality of remote stations, and the sixth node 160 communicating with a first remote station 161 of the sixth plurality of remote stations. The seventh node 170 and the eighth node 180 are shown communicating with a seventh plurality of remote stations 171, and an eighth plurality of remote stations 181, 182, respectively. The ninth node 190 communicates with a ninth plurality of remote stations, and FIG. 2 shows the ninth node 190 communicating with a first remote station 191 of the ninth plurality of remote stations.

Handoff Between Base Stations

Figure 3:
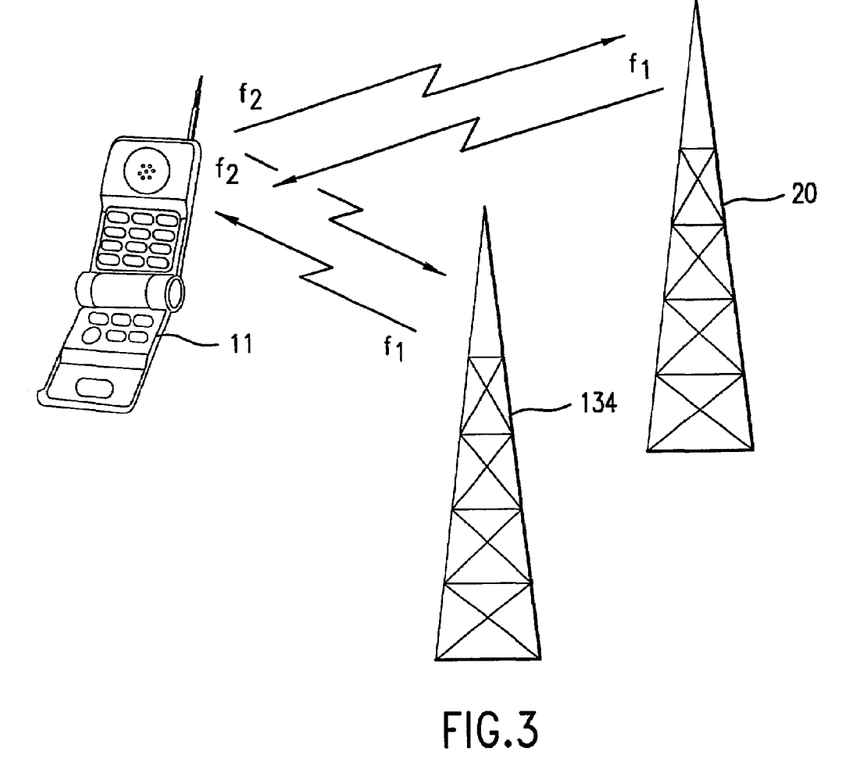
FIG. 3 illustrates a remote station communicating between two base stations.

The improvement to the method and system of the instant invention provides handoff for a packetized, direct-sequence, spread-spectrum CDMA system, for the star network and distributed network, as represented in FIG. 1 or FIG. 2, respectively. Assume that a remote station (RS) 11, as shown, for example, in FIG. 3, is communicating with a first base station (BS) 12 within a spread-spectrum, CDMA network.

For the spread-spectrum, CDMA network, the first base 12 station transmits, using radio waves, a first BS-packet signal to the remote station 11. The first BS-packet signal is a spread-spectrum signal, since the first BS-packet signal is spread by a first BS-chip-sequence signal at a first frequency $f_1$. Spread-spectrum technology for spreading a packet signal, in general, is well known in the art. Examples include a spread-spectrum transmitter using a chip-sequence generator for generating a chip-sequence signal. The data in the packet signal is spread by a multiplying device or AND gate, by the chip-sequence signal. Equivalently, a replica of the chip-sequence signal can be stored in memory and outputted in response a proper symbol input, such as a bit.

The remote station 11, using a spread-spectrum receiver, receives the first BS-packet signal. A replica of the first BS-chip-sequence signal, or equivalently a matched filter matched to the first BS-chip-sequence signal, is used by the spread-spectrum receiver of the remote station for despreading BS-packet signals arriving from the first base station 20. The replica of the first BS-chip-sequence signal also could be used with a product detector and output filter for despreading the packet signal. The product detector and matched filter for despreading a spread-spectrum signal are well known in the art.

The remote station 11 transmits, using radio waves, a first RS-packet signal to the first base station 20. The first RS-packet signal is spread by a first RS-chip-sequence signal at a second frequency $f_2$. Spread-spectrum transmitters and spread-spectrum technology for spreading the packet signals are well known in the art, as previously discussed for the first base station 20.

A replica of the first RS-chip-sequence signal, or equivalently a matched filter matched to the first RS-chip-sequence signal, is used by the first base station 20 for despreading the first RS-packet signal. The first RS-packet signal includes a source address from the remote station 11, and a destination address for the central office 50. The destination address routes packet signals to the recipient of the packet signal. The source address from the remote station 11 later is used for routing packet signals to the remote station 11. Source address and destination address are well known in the art. The destination address and the source address are put on the first RS-packet signal prior to spreading the first RS-packet signal.

Referring to FIG. 1, by way of example, the first base station 20 receives the first RS-packet signal at the second frequency $f_2$. The first base station 20 normally would despread the first RS-packet signal, add or append its address to the packet signal, and then send the despread first RS-packet signal, by way of example, to a central office 50 of FIG. 1. In FIG. 2, the eighth base station, located at node 180, forwards a packet signal to a fifth base station, located at node 150, and a second base station, located at node 120, en route to the central office 50. The RS-packet signals from the remote station could be forwarded through base stations to the central office by wired channel or wireless channel. Technology for despreading the RS-packet signal is well known in the art, as discussed for the remote station 11.

In summary, The first RS-packet signal includes a source address from the remote station, and the source address forwarded from the first base station. The despread first RS-packet signal includes the source address from the remote station, and the source address from the first base station.

In a preferred embodiment, a base station despreads a packet signal, in general, and for this example, an RS-packet signal, and stores the RS-packet signal for transmission the central office. The flow control mechanism, used by the nodes in FIG. 2, permits packet signals to be forwarded in an efficient manner to one of several base stations en route to the central office 50. The use of flow control in a distributed network is well known to the ordinary skilled artisan in the art.

Referring to FIG. 3, while the remote station 11 communicates with the first base station 20, the remote station 11 monitors, at the first frequency $f_1$, other base stations in geographic proximity to the remote station 11. Assume, as an illustrative example, that the remote station 11 is required to handoff to another base station because the power level is falling below a threshold or the capacity of the remote station is falling below a threshold. The remote station 11 may monitor the signal or power level and capacity availability of control and packet transmission channels, or other channels, of the other base stations from nearby micro-cells. Assume that from a plurality of base stations monitored by the remote station, that the actual base station for handoff is defined herein as the second base station 134.

Prior to handoff, the second base station 134 transmits, using radio waves, a second BS-packet signal, spread by a second BS-chip-sequence signal at the first frequency $f_1$. The remote station 11 monitors signal metrics of the first BS-packet signal from the first base station 20, and the same signal metrics of the other BS-packet signals from the other base stations in the plurality of base stations. A signal metric typically would be received power or energy level, and capacity level.

The remote station 11 determines when the signal power metric of the first BS-packet signal falls below a threshold and that the signal metrics of one or more BS-packet signals are above the threshold. The remote station 11 also determines from the other base stations, which of the other base stations has available capacity. Available capacity is ability to store despread RS-packet signals and other packets signals passing through the other base stations. The remote station 11 then selects a base station, which is defined herein as second base station 134, which meets the requirements of the signal metric and available capacity. The remote station 11 also determines which BS-chip-sequence signals are available for use with the second base station 134. A set of BS-chip-sequence signal and RS-chip-sequence signal are assigned and used by the remote station 11, when communicating with the second base station 134.

Upon determining the foregoing threshold crossings, the remote station 11 changes communications from the first base station 20 to the second base station 134, using a new set of second RS-chip-sequence signal and second BS-chip-sequence signal. In response to determining to change communications between base stations, the remote station 11 transmits, using radio waves, a second RS-packet signal to the second base station 134. The second RS-packet signal is defined herein to be an RS-packet signal sent from the remote station to the second base station 134.

After the second base station 134 receives and despreads the second RS-packet signal at the second frequency $f_2$, the second base station 134 sends the despread second RS-packet signal to the central office either as used in FIG. 1 or FIG. 2. The despread second RS-packet signal includes a source address from the second base station 134, which was added to the second RS-packet signal by the second base station 134.

For return communications from the central office to the remote station 11, the central office reads the source addresses from the RS-packet signal, of the remote station 11 and the forwarding base station. For this example, the central office reads the source address for the second base station 134. From the source addresses, the central office knows to route return packet signals, denoted herein as CO-packet signal to the remote station 11 through the second base station 134.

The central office sends to the spread-spectrum, CDMA network, a CO-packet signal, including a destination address for the second base station 134 and the remote station 11. The second base station 134 receives the CO-packet signal of FIG. 1 or FIG. 2. The second base station 134 transmits, using radio waves, the CO-packet signal, at the first frequency $f_1$, as a third BS-packet signal, respectively, each spread by the second BS-chip-sequence signal. The third BS-packet signal is defined herein to be the CO-packet signal when the CO-packet signal is sent from the second base station 134 to the remote station 11. The remote station 11 receives the CO-packet signal. The invention has the central office route the CO-packet signal to the second base station 134, since the second base station 134 is the location from which the remote station 11 last transmitted, as determined from the second base station 134 source address and the remote station 11 source address in the second packet signal previously received at the central office.

Spread-Spectrum Channel Sounding

The present invention may be extended to include a sounding channel. The sounding channel presents an additional signal metric from which to make a determination when to handoff. In addition, the sounding channel provides an accurate measure of the appropriate signal level for the remote station, when transmitting to the base station. The sounding channel is incorporated herein by reference, and is disclosed in U.S. patent application Ser. No. 09/231,015, with filing date of Jan. 14, 1999, entitled, SPREAD-SPECTRUM CHANNEL SOUNDING, by inventor Donald L. Schilling, now U.S. Pat. No. 6,269,092, with issue date Jul. 31, 2001.

The addition of a sounding channel overcomes a major problem with a plurality of remote stations transmitting to a common base station. The plurality of remote stations may be located at different distances, and each remote station may have a different propagation path, to the base station. Thus, even if all the remote stations transmitted with the same power level, then the spread-spectrum signal from each remote station may arrive at the base station with a different power level. A strong power level from one remote station may cause sufficient interference to block or inhibit reception of the spread-spectrum signal from a more distant remote station. This power problem is commonly known as the "near-far" problem, or power control problem: How does the spread-spectrum system control the power transmitted from each remote station, so that the power received at the base station from each remote station is approximately the same? If the average power received at the base station were the same for each remote station, then the capacity is limited by the number of remote stations transmitting to the base station. If, however, a particular remote station were sufficiently close to the base station, and its transmitter power could block reception of other remote stations, then capacity may be limited severely to only the remote station closest to the base station.

The sounding channel overcomes the power control problem by permitting a remote station to have knowledge, a priori to transmitting, of a proper power level to initiate transmission. After the initial power level is used, closed-loop power control, which is well-known in the art, can be employed.

An additional or alternative benefit from the sounding is more accurate frequency control at a remote station. The carrier frequency transmitted from a remote station may be shifted at the base station due to Doppler shift in carrier frequency caused by motion. The sounding channel initially corrects or compensates for Doppler shift in carrier frequency caused by the effective motion of the remote station. The remote station could be at a fixed location, and the Doppler shift in carrier frequency could be caused by time changes in the propagation path, such as trees blowing in the wind. After initial communications, a Costas loop or other frequency controlling circuit may be employed to control or compensate for frequency changes. Such devices or circuits are well-known in the art.

Figure 4:
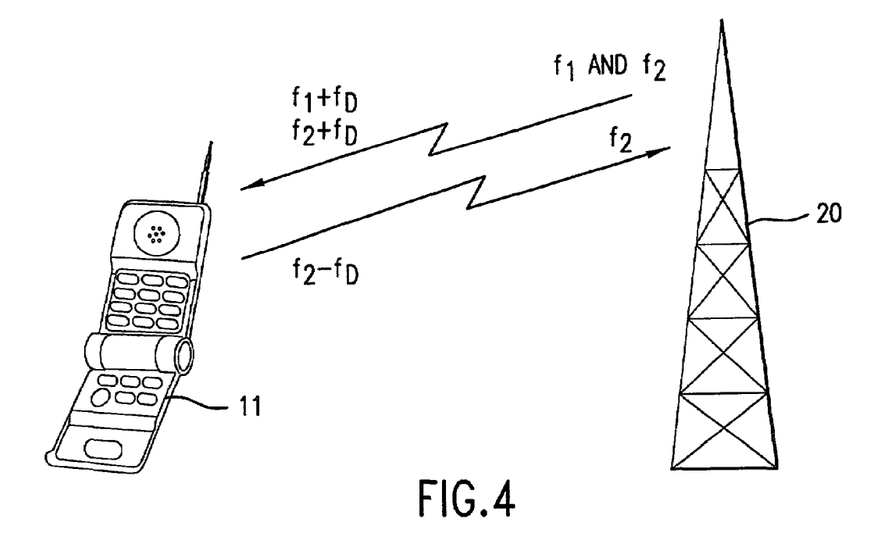
FIG. 4 illustrates a remote station communicating with a base station, with channel sounding.

As illustratively shown in FIG. 4, the sounding channel broadly provides an improvement to a spread-spectrum system which has a base station and a plurality of remote stations operating in FDD mode. The base station has a BS-spread-spectrum transmitter and a BS-spread-spectrum receiver. The BS-spread-spectrum transmitter transmits, using radio waves, a plurality of BS-spread-spectrum signals at a first frequency $f_1$. The BS-spread-spectrum receiver receives, at a second frequency $f_2$, a plurality of RS-spread-spectrum signals from the plurality of remote stations. The plurality of BS-spread-spectrum signals at the first frequency $f_1$ are outside the correlation bandwidth of the plurality of RS-spread-spectrum signals at the second frequency $f_2$. Each of the plurality of remote stations has an RS-spread-spectrum transmitter for transmitting an RS-spread-spectrum signal at the second frequency $f_2$.

The improvement includes a BS transmitter and an interference-reduction subsystem, located at the base station receiver. The BS transmitter transmits, using radio waves, a BS-channel-sounding signal at the second frequency. The BS-channel-sounding signal has a bandwidth no more than twenty per cent of the spread-spectrum bandwidth of the plurality of RS-spread-spectrum signals, and in a preferred embodiment, the BS-channel-sounding signal has a bandwidth no more than one percent of the spread-spectrum bandwidth of the plurality of RS-spread-spectrum signals.

At each remote station, the improvement includes an RS-power-level circuit and an RS receiver which has an RS demodulator. The improvement at the remote station also may include a frequency-adjust circuit. The RS receiver receives the BS-channel-sounding signal at the second frequency. The RS demodulator tracks the BS-channel-sounding signal, and outputs an RS-receiver signal. Using the receiver power level of the RS-receiver signal, the RS-power-level circuit adjusts an RS-power level of the RS-spread-spectrum transmitter located at the remote station. If the frequency-adjust circuit were employed, then the frequency-adjust circuit, using the received RS-receiver signal as a reference, compensates to the first frequency the RS-spread-spectrum signal of the RS-spread-spectrum transmitter located at the remote station.

The interference-reduction subsystem is located at the base station and at a front end to the BS-spread-spectrum receiver. The interference-reduction subsystem reduces, at the second frequency, the BS-channel-sounding signal from the plurality of RS-spread-spectrum signals arriving at the base station.

In the exemplary arrangement shown in FIG. 4, the first base station 20 is shown communicating, using radio waves, with a remote station with frequency compensation. Since the BS-channel-sounding signal is transmitted, as a radio wave, from the base station 20 at the second frequency $f_2$ to the remote station 11, and the remote station 11 knows at what frequency the BS-channel-sounding signal is suppose to be received, then remote station 11 can determine the Doppler frequency shift $f_D$ and compensate its transmitter frequency by a similar amount so that the RS-spread-spectrum signal arrives at the base station 20 with a carrier frequency at the correct second frequency $f_2$. Thus, the RS-spread-spectrum signal is detected at the base station at the second frequency $f_2$, without a Doppler shift in carrier frequency $f_D$. If motion of the remote station caused a positive shift in the Doppler frequency $f_D$, then the correct compensation would be to subtract the Doppler shift in carrier frequency $f_D$ and transmit at frequency $f_2-f_D$. The remote station 11 also can measure the power level of the BS-channel-sounding signal, and from this measurement, set its initial power level for transmitting the RS-spread-spectrum signal at frequency $f_2$.

For determining when to handoff to a second base station 134 of FIG. 3, the remote station can monitor the signal metric of the sounding channel. Handoff can be based on a signal metric of either the first BS-packet signal, or the sounding channel, or a combination of the first BS-packet signal and the sounding channel, as well as available capacity.

It will be apparent to those skilled in the art that various modifications can be made to the spread-spectrum channel sounding improvement of the instant invention without departing from the scope or spirit of the invention, and it is intended that the present invention cover modifications and variations of the spread-spectrum channel sounding improvement provided they come within the scope of the appended claims and their equivalents.

We claim:

1. An improvement method to a frequency division duplex (FDD) distributed-network, spread-spectrum system comprising the steps of:
    transmitting, using radio waves, from a first base station (BS), located in, and part of, the FDD distributed network, a first BS-packet signal at a first frequency;
    receiving at a remote station (RS) the first BS-packet signal, thereby obtaining a first RS-received signal;
    transmitting, using radio waves, from a second base station a second BS-packet signal at a second frequency, with the second frequency different from the first frequency;
    receiving at said remote station the second BS-packet signal at the second frequency, thereby obtaining a second RS-received signal;
    monitoring at said remote station a first signal metric of the first RS-received signal, and a second signal metric of the second RS-received signal; and
    determining at said remote station that the first signal metric of the first RS-received signal falls below a threshold, and that the second signal metric of the second RS-received signal is above the threshold, and that the second base station has available capacity, thereby determining to change base stations.

2. The improvement as set forth in claim 1, further including the steps of:
    transmitting, using radio waves, from a third base station, located in, and part of, the FDD distributed network, a third BS-packet signal spread at a third frequency, with the third frequency different from the second frequency and the first frequency;
    receiving at the remote station the third BS-packet signal, thereby obtaining a third RS-received signal;
    monitoring at said remote station the first signal metric of the first RS-received signal, the second signal metric of the second RS-received signal and a third signal metric of third RS-received signal, and
    determining at said remote station that the first signal metric falls below the threshold, and that the second signal metric or the third signal metric, is above the threshold, and that any of the second base station or the third base station, has available capacity, thereby determining to change base stations.

3. The improvement as set forth in claim 2, further including the steps of:
    transmitting, using radio waves, from a fourth base station, located in, and part of, the FDD distributed network, a fourth BS-packet signal spread at a fourth frequency, with the fourth frequency different from the first frequency, the second frequency and the third frequency;
    receiving at the remote station the fourth BS-packet signal, thereby obtaining a fourth RS-receiver signal;
    monitoring at said remote station a signal metric of the first RS-received signal, the second signal metric of the second RS-received signal, the third signal metric of the third RS-received signal and a fourth signal metric of the fourth RS-received signal, and
    determining at said remote station that the first signal metric falls below the threshold, and that the second signal metric or the third signal metric or the fourth signal metric, is above the threshold, and that any of the second base station, the third base station or the fourth base station, has available capacity, thereby determining to change base stations.

4. The improvement as set forth in claim 3, further including the steps of:
    transmitting, using radio waves, from a fifth base station, located in, and part of, the FDD distributed network, a fifth BS-packet signal spread at a fifth frequency, with the fifth frequency different from the first frequency, the second frequency, the third frequency and the fourth frequency;
    receiving at the remote station the fifth BS-packet signal, thereby obtaining a fifth RS-receiver signal;
    monitoring at said remote station the first signal metric of the first RS-received signal, the second signal metric of the second RS-received signal, the third signal metric of the third RS-received signal, the fourth signal metric of the fourth RS-received signal and a fifth signal metric of the fifth RS-received signal, and
    determining at said remote station that the first signal metric falls below the threshold, and that the second signal metric or the third signal metric or the fourth signal metric or the fifth signal metric, is above the threshold, and that any of the second base station, the third base station, the fourth base station, or the fifth base station, has available capacity, thereby determining to change base stations.

5. The improvement as set forth in claim 4, further including the steps of:
    transmitting, using radio waves, from a sixth base station, located in, and part of, the FDD distributed network, a sixth BS-packet signal spread at a sixth frequency, with the sixth frequency different from the first frequency, the second frequency, the third frequency, the fourth frequency and the fifth frequency;
    receiving at the remote station the sixth BS-packet signal, thereby obtaining a sixth RS-receiver signal;
    monitoring at said remote station the first signal metric of the first BS-packet signal, second signal metric of the second BS-packet signal, the third signal metric of the third BS-packet signal, the fourth signal metric of the fourth BS-packet signal, the fifth signal metric of the fifth BS-packet signal and a sixth signal metric of the sixth BS-packet signal, and
    determining at said remote station that the first signal metric falls below the threshold, and that the second signal metric or the third signal metric or the fourth signal metric or the fifth signal metric or the sixth signal metric, is above the threshold, and that any of the second base station, the third base station or the fourth base station or the fifth base station or the sixth base station, has available capacity, thereby determining to change base stations.

6. An improvement to a spread-spectrum system comprising:
- a frequency division duplex (FDD), distributed network;
- a first base station (BS), located in, and part of, the FDD distributed network, for transmitting, using radio waves, a first BS-packet signal at a first frequency;
- a second base station, located in, and part of, the FDD distributed network, for transmitting, using radio waves, a second BS-packet signal at a second frequency, with the second frequency different from the first frequency;
- a remote station (RS) for receiving the first BS-packet signal and the second BS-packet signal, and thereby determining a first RS-received signal and a second RS-received signal, respectively; and
- said remote station for determining that a first signal falls below a threshold and that a second signal metric of the second RS-received signal is above the threshold, and that the second base station has available capacity, thereby deciding to change base stations.

7. The system as set forth in claim 6, further including:
- a third base station, located in, and part of, the FDD distributed network, for transmitting, using radio waves, a third BS-packet signal spread at a third frequency, with the third frequency different from the second frequency and the first frequency;
- the remote station for receiving the third BS-packet signal, thereby obtaining a third RS-received signal, the remote station for monitoring the first signal metric of the first RS-received signal, the second signal metric of the second RS-received signal and a third signal metric of third RS-received signal, and
- said remote station for determining that the first signal metric falls below the threshold, and that the second signal metric or the third signal metric, is above the threshold, and that any of the second base station or the third base station, has available capacity, thereby determining to change base stations.

8. The system as set forth in claim 7, further including:
- a fourth base station, located in, and part of, the FDD distributed network, for transmitting, using radio waves, a fourth BS-packet signal spread at a fourth frequency, with the fourth frequency different from the first frequency, the second frequency and the third frequency;
- said remote station for receiving the fourth BS-packet signal, thereby obtaining a fourth RS-receiver signal, the remote station for monitoring a signal metric of the first RS-received signal, the second signal metric of the second RS-received signal, the third signal metric of the third RS-received signal and a fourth signal metric of the fourth RS-received signal, and
- said remote station for determining that the first signal metric falls below the threshold, and that the second signal metric or the third signal metric or the fourth signal metric, is above the threshold, and that any of the second base station, the third base station or the fourth base station, has available capacity, thereby determining to change base stations.

9. The system as set forth in claim 8, further including:
- a fifth base station, located in, and part of, the FDD distributed network, for transmitting, using radio waves, a fifth BS-packet signal spread at a fifth frequency, with the fifth frequency different from the first frequency, the second frequency, the third frequency and the fourth frequency;
- said remote station for receiving the fifth BS-packet signal, thereby obtaining a fifth RS-receiver signal, the remote station for monitoring the first signal metric of the first RS-received signal, the second signal metric of the second RS-received signal, the third signal metric of the third RS-received signal, the fourth signal metric of the fourth RS-received signal and a fifth signal metric of the fifth RS-received signal, and
- said remote station for determining that the first signal metric falls below the threshold, and that the second signal metric or the third signal metric or the fourth signal metric or the fifth signal metric, is above the threshold, and that any of the second base station, the third base station, the fourth base station, or the fifth base station, has available capacity, thereby determining to change base stations.

10. An improvement to a spread spectrum system comprising:
- a frequency division duplex (FDD), distributed network;
- first base station (BS) means, located in, and part of, the FDD distributed network, for transmitting, using radio waves, a first BS-packet signal spread at a first frequency;
- second base station means, located in, and part of, the FDD distributed network, for transmitting, using radio waves, a second BS-packet signal spread signal at a second frequency, with the second frequency different from the first frequency; and
- remote station (RS) means for receiving the first BS-packet signal and the second BS-packet signal, and thereby determining a first RS-received signal and a second RS-received signal, respectively; the RS means for monitoring a first signal metric of the first BS-packet signal, RS means for determining that the first signal metric of falls below a threshold, and that the second signal metric is above the threshold, and that the second base station has available capacity, thereby determining to change base stations.

11. The improvement as set forth in claim 10, further including:
- third BS means, located in, and part of, the FDD distributed network, for transmitting, using radio waves, a third BS-packet signal spread at a third frequency, with the third frequency different from the second frequency and the first frequency;
- said RS means for receiving the third BS-packet signal, thereby obtaining a third RS-received signal, the RS means for monitoring the first signal metric of the first RS-received signal, the second signal metric of the second RS-received signal and a third signal metric of third RS-received signal, and
- said RS means for determining that the first signal metric falls below the threshold, and that the second signal metric or the third signal metric, is above the threshold, and that any of the second BS means or the third BS means, has available capacity, thereby determining to change base station means.

12. The improvement as set forth in claim 11, further including:
- fourth BS means, located in, and part of, the FDD distributed network, for transmitting, using radio waves, a fourth BS-packet signal spread at a fourth frequency, with the fourth frequency different from the first frequency, the second frequency and the third frequency;
- said RS means for receiving the fourth BS-packet signal, thereby obtaining a fourth RS-receiver signal, the RS means for monitoring a signal metric of the first RS-received signal, the second signal metric of the second RS-received signal, the third signal metric of the third RS-received signal and a fourth signal metric of the fourth RS-received signal, and said RS means for determining that the first signal metric falls below the threshold, and that the second signal metric or the third signal metric or the fourth signal metric, is above the threshold, and that any of the second BS means, the third BS means or the fourth BS means, has available capacity, thereby determining to change base station means.

13. The improvement as set forth in claim 12, further including:

fifth BS means, located in, and part of, the FDD distributed network, for transmitting, using radio waves, a fifth BS-packet signal spread at a fifth frequency, with the fifth frequency different from the first frequency, the second frequency, the third frequency and the fourth frequency;

said RS means for receiving the fifth BS-packet signal, thereby obtaining a fifth RS-receiver signal, the RS means for monitoring the first signal metric of the first RS-received signal, the second signal metric of the second RS-received signal, the third signal metric of the third RS-received signal, the fourth signal metric of the fourth RS-received signal and a fifth signal metric of the fifth RS-received signal, and said RS means for determining that the first signal metric falls below the threshold, and that the second signal metric or the third signal metric or the fourth signal metric or the fifth signal metric, is above the threshold, and that any of the second BS means, the third BS means, the fourth BS means, or the fifth BS means, has available capacity, thereby determining to change base station means.

14. An improvement to a distributed network comprising:

a frequency division duplex (FDD), distributed network;

a first base station (BS), located in, and part of, the FDD distributed network, for transmitting, using radio waves, a first BS-packet signal;

a remote station (RS), located in, and part of, the FDD distributed network, for receiving the first BS-packet signal;

a second base station, located in, and part of, the FDD distributed network, for transmitting, using radio waves, a second BS-packet signal;

said remote station for monitoring a signal metric of the first BS-packet signal and a signal metric of the second BS-packet signal, for determining that the signal metric of the first BS-packet signal falls below a threshold and that the signal metric of the second BS-packet signal is above the threshold, and in response to determining that the signal metric of the first BS-packet signal falls below the threshold and that the signal metric of the second BS-packet signal is above the threshold, handing off communications to the second base station, by transmitting, using radio waves, an RS-packet signal;

said second base station for receiving the RS-packet signal, and for sending the RS-packet signal to a central office (CO), with the RS-packet signal including a source address from the second base station;

said central office for sending a CO-packet signal including a destination address for the second base station; and said second base station for receiving the CO-packet signal, and for transmitting, using radio waves, the CO-packet signal to said remote station.

15. The improvement as set forth in claim 14, with said remote station including means for determining that the second base station has available capacity, in order to hand off communications to the second base station.

16. An improvement for a frequency division duplex (FDD) distributed network method comprising the steps of:

transmitting, using radio waves, from a first base station (BS) located in, and part of, the FDD distributed network, a first BS-packet signal;

receiving at a remote station (RS), located in, and part of, the FDD distributed network, the first BS-packet signal;

transmitting, using radio waves, from a second base station, located in, and part of, the FDD distributed network, a second BS-packet signal;

monitoring at said remote station a signal metric of the first BS-packet signal and a signal metric of the second BS-packet signal;

determining that the signal metric of the first BS-packet signal falls below a threshold and that the signal metric of the second BS-packet signal is above the threshold;

handing off, in response to determining that the signal metric of the first BS-packet signal falls below the threshold and that the signal metric of the second BS-packet signal is above the threshold, communications to the second base station by transmitting, using radio waves, an RS-packet signal;

receiving at said second base station the RS-packet signal;

sending the RS-packet signal to a central office (CO), with the RS-packet signal including a source address from the second base station;

sending from said central office a CO-packet signal including a destination address for the second base station;

receiving at said second base station the CO-packet signal; and transmitting, using radio waves, the CO-packet signal to said remote station.

17. The improvement as set forth in claim 16, with the step of determining including the step of determining that the second base station has available capacity, in order to hand off communications to the second base station.

18. An improvement to a distributed network comprising:

a frequency division duplex (FDD), distributed network;

first base-station (BS) means, located in, and part of, the FDD distributed network, for transmitting, using radio waves, a first BS-packet signal;

remote-station (RS) means, located in, and part of, the FDD distributed network, for receiving the first BS-packet signal;

second base-station means, located in, and part of, the FDD distributed network, for transmitting, using radio waves, a second BS-packet signal;

said remote-station means for monitoring a signal metric of the first BS-packet signal and a signal metric of the second BS-packet signal, for determining that the signal metric of the first BS-packet signal falls below a threshold and that the signal metric of the second BS-packet signal is above the threshold, and in response to determining that the signal metric of the first BS-packet signal falls below the threshold and that the signal metric of the second BS-packet signal is above the threshold, handing off communications to the second base station, by transmitting, using radio waves, an RS-packet signal;

said second base-station means for receiving the RS-packet signal, and for sending the RS-packet signal to central office (CO) means, with the RS-packet signal including a source address from the second base station;

said central-office means for sending a CO-packet signal including a destination address for the second base station; and said second base-station means for receiving the CO-packet signal, and for transmitting, using radio waves, the CO-packet signal to said remote station.

19. The improvement as set forth in claim 18, with said remote-station means including means for determining that the second base-station means has available capacity in order to hand off communications to the second base station.

20. An improvement to a distributed network comprising:
a frequency division duplex (FDD), distributed network;
a first base station (BS), located in, and part of, the FDD distributed network, for transmitting, using radio waves, a first BS-packet signal;
a remote station (RS), located in, and part of, the FDD distributed network, for receiving the first BS-packet signal;
a second base station, located in, and part of, the FDD distributed network, for transmitting, using radio waves, a second BS-packet signal;
said remote station for monitoring a signal metric of the first BS-packet signal and a signal metric of the second BS-packet signal, for determining that the signal metric of the first BS-packet signal falls below a threshold and that the signal metric of the second BS-packet signal is above the threshold, and in response to determining that the signal metric of the first BS-packet signal falls below the threshold and that the signal metric of the second BS-packet signal is above the threshold, handing off communications to the second base station, by transmitting, using radio waves, an RS-packet signal;
said second base station for receiving the RS-packet signal, and for sending the RS-packet signal to a destination node (DN), with the RS-packet signal including a source address from the second base station;
said destination node for sending a DN-packet signal including a destination address for the second base station; and
said second base station for receiving the DN-packet signal, and for transmitting, using radio waves, the DN-packet signal to said remote station.

21. The improvement as set forth in claim 20, with said remote station including means for determining that the second base station has available capacity, in order to hand off communications to the second base station.

22. An improvement for a frequency division duplex (FDD) distributed network method comprising the steps of:
transmitting, using radio waves, from a first base station (BS) located in, and part of, the FDD distributed network, a first BS-packet signal;
receiving at a remote station (RS), located in, and part of, the FDD distributed network, the first BS-packet signal;
transmitting, using radio waves, from a second base station, located in, and part of, the FDD distributed network, a second BS-packet signal;
monitoring at said remote station a signal metric of the first BS-packet signal and a signal metric of the second BS-packet signal;
determining that the signal metric of the first BS-packet signal falls below a threshold and that the signal metric of the second BS-packet signal is above the threshold;
handing off, in response to determining that the signal metric of the first BS-packet signal falls below the threshold and that the signal metric of the second BS-packet signal is above the threshold, communications to the second base station by transmitting, using radio waves, an RS-packet signal;
receiving at said second base station the RS-packet signal;
sending the RS-packet signal to a destination node (DN), with the RS-packet signal including a source address from the second base station;
sending from said destination node a DN-packet signal including a destination address for the second base station;
receiving at said second base station the DN-packet signal; and
transmitting, using radio waves, the DN-packet signal to said remote station.

23. The improvement as set forth in claim 22, with the step of determining including the step of determining that the second base station has available capacity, in order to hand off communications to the second base station.

24. An improvement to a distributed network comprising:
a frequency division duplex (FDD), distributed network;
first base-station (BS) means, located in, and part of, the FDD distributed network, for transmitting, using radio waves, a first BS-packet signal;
remote-station (RS) means, located in, and part of, the FDD distributed network, for receiving the first BS-packet signal;
second base-station means, located in, and part of, the FDD distributed network, for transmitting, using radio waves, a second BS-packet signal;
said remote-station means for monitoring a signal metric of the first BS-packet signal and a signal metric of the second BS-packet signal, for determining that the signal metric of the first BS-packet signal falls below a threshold and that the signal metric of the second BS-packet signal is above the threshold, and in response to determining that the signal metric of the first BS-packet signal falls below the threshold and that the signal metric of the second BS-packet signal is above the threshold, handing off communications to the second base station, by transmitting, using radio waves, an RS-packet signal;
said second base-station means for receiving the RS-packet signal, and for sending the RS-packet signal to destination-node (DN) means, with the RS-packet signal including a source address from the second base station;
said destination-node means for sending a DN-packet signal including a destination address for the second base station; and
said second base-station means for receiving the DN-packet signal, and for transmitting, using radio waves, the DN-packet signal to said remote station.

25. The improvement as set forth in claim 24, with said remote-station means including means for determining that the second base-station means has available capacity in order to hand off communications to the second base station.

* * * * *